United States Patent
Kowarz (10) Patent No.: US 6,594,060 B2
(45) Date of Patent: *Jul. 15, 2003

(54) ELECTROMECHANICAL CONFORMAL GRATING DEVICE WITH IMPROVED OPTICAL EFFICIENCY AND CONTRAST

(75) Inventor: Marek W. Kowarz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 09/821,529

(22) Filed: Mar. 29, 2001

(65) Prior Publication Data

US 2002/0176145 A1 Nov. 28, 2002

(51) Int. Cl.[7] .............................................. G02B 26/00
(52) U.S. Cl. .................... 359/231; 359/230; 359/291; 359/295; 359/572; 359/573
(58) Field of Search ................. 359/572, 573, 359/291, 292, 295, 290, 223–225, 900

(56) References Cited

U.S. PATENT DOCUMENTS

| 4,626,920 A | 12/1986 | Glenn |
| 4,857,978 A | 8/1989 | Goldburt et al. |
| 5,311,360 A | 5/1994 | Bloom et al. |
| 5,459,610 A | 10/1995 | Bloom et al. |
| 5,677,783 A | 10/1997 | Bloom et al. |

*Primary Examiner*—John Juba, Jr.
*Assistant Examiner*—Fayez Assaf
(74) *Attorney, Agent, or Firm*—Stephen H. Shaw (57) ABSTRACT

An electromechanical conformal grating device having a period $\Lambda$, that includes: an elongated ribbon element including a light reflective surface; a pair of end supports for supporting the elongated ribbon element at both ends over a substrate; an intermediate support; and means for applying a force to the elongated ribbon element to cause the element to deform between first and second operating states, where in the second operating state the elongated ribbon element mechanically conforms to the intermediate support forming a conformal grating having alternating raised and lowered portions, and wherein the length of the raised and lowered portions are substantially equal.

29 Claims, 9 Drawing Sheets

ELECTROMECHANICAL CONFORMAL GRATING DEVICE WITH IMPROVED OPTICAL EFFICIENCY AND CONTRAST

FIELD OF THE INVENTION

This invention relates to the design of a micromechanical device for spatially and temporally modulating an incident beam of light by diffraction. More particularly, this invention discloses an electromechanical conformal grating device having a support structure designed for improved optical efficiency and contrast.

BACKGROUND OF THE INVENTION

Electromechanical spatial light modulators with a variety of designs have been used in applications such as display, optical processing, printing, optical data storage and spectroscopy. These modulators produce spatial variations in the phase and/or amplitude of an incident light beam using arrays of individually addressable devices.

One class of electromechanical spatial light modulators has devices with a periodic sequence of reflective elements that form electromechanical phase gratings. In such devices, the incident light beam is selectively reflected or diffracted into a number of discrete orders. Depending on the application, one or more of these diffracted orders may be collected and used by the optical system. Electromechanical phase gratings can be formed in metallized elastomer gels; see U.S. Pat. No. 4,626,920 issued Dec. 2, 1986 to Glenn, and U.S. Pat. No. 4,857,978 issued Aug. 15, 1989 to Goldburt et al. The electrodes below the elastomer are patterned so that the application of a voltage deforms the elastomer producing a nearly sinusoidal phase grating. These types of devices have been successfully used in color projection displays.

An electromechanical phase grating with a much faster response time can be made of suspended micromechanical ribbon elements, as described in U.S. Pat. No. 5,311,360 issued May 10, 1994, to Bloom et al. This device, also known as a grating light valve (GLV), can be fabricated with CMOS-like processes on silicon. Improvements in the device were later described by Bloom et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast; see U.S. Pat. No. 5,459,610 issued Oct. 17, 1995. Bloom et al. also presented a method for fabricating the device; see U.S. Pat. No. 5,677,783 issued Oct. 14, 1997. With linear GLV arrays of this type, the diffraction direction is not perpendicular to the array direction, which increases the complexity of the optical system required for separation of the diffracted orders. Furthermore, the active region of the array is relatively narrow requiring good alignment of line illumination over the entire length of the array, typically to within 10–30 microns over a few centimeters of length. The line illumination then also needs to be very straight over the entire linear array.

There is a need therefore for a linear array of grating devices that has a large active region with the diffraction direction perpendicular to the array direction. Furthermore, the device must be able to diffract light efficiently into discrete orders while having high contrast and high speed. Additionally, the device fabrication must be compatible with CMOS-like processes.

SUMMARY OF THE INVENTION

The need is met according to the present invention by providing an electromechanical conformal grating device having a period A, that includes: an elongated ribbon element including a light reflective surface; a pair of end supports for supporting the elongated ribbon element at both ends over a substrate; an intermediate support; and means for applying a force to the elongated ribbon element to cause the element to deform between first and second operating states, where in the second operating state the elongated ribbon element mechanically conforms to the intermediate support forming a conformal grating having alternating raised and lowered portions, and wherein the length of the raised and lowered portions are substantially equal.

DETAILED DESCRIPTION OF THE INVENTION

The grating structure in a GLV is defined by the patterning of the ribbon elements. A completely different class of electromechanical grating devices may be obtained by defining a grating structure in the supports below elongated ribbon elements. These conformal grating devices function on the principle of a hidden grating. In the unactuated state, the grating structure is completely hidden from view and the device functions as a mirror. In the actuated state, the elongated ribbon elements deform to reveal the grating structure of the supports, thus generating a partially conformal diffraction grating. Conformal grating devices are therefore similar in function to metallized elastomer gel gratings, but have the high speed capabilities of GLVs. In addition, fabrication is compatible with CMOS-like processes. Some conformal grating devices do not have the maximum possible optical efficiency and contrast because the support structure below the elongated ribbon elements may not be optimal. There is a need therefore for a better support structure.

Figure 1:
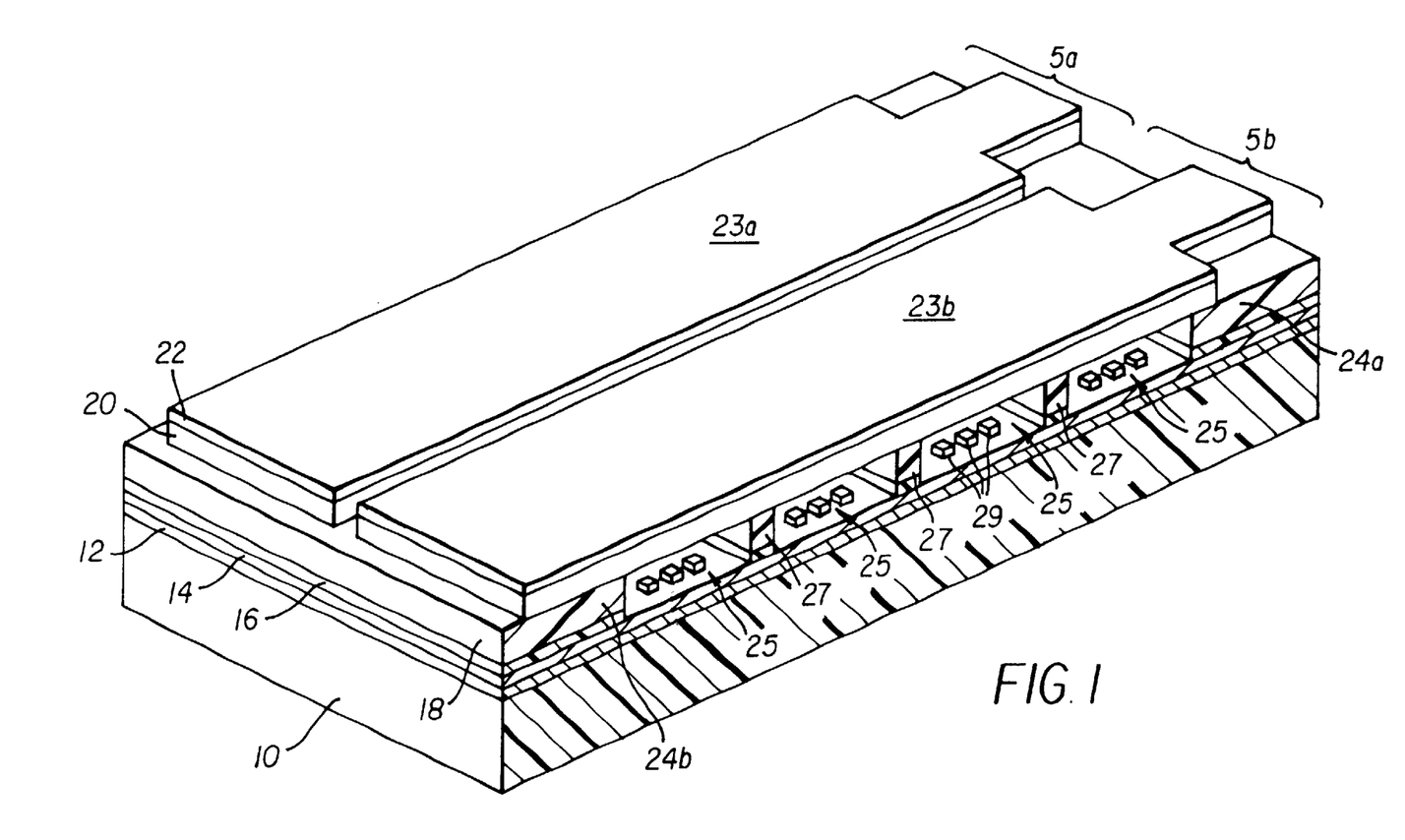
FIG. 1 is a perspective, partially cut-away view of a spatial light modulator with electromechanical conformal grating devices, showing two devices in a linear array.

FIG. 1 shows the structure of two side-by-side conformal grating devices 5a and 5b in an unactuated state. In this embodiment, the devices can be operated by the application of an electrostatic force. The grating devices 5a and 5b are formed on top of a substrate 10, made of glass, metal, plastic or semiconductor materials, that is covered by a bottom conductive layer 12 which acts as an electrode to actuate the devices. The bottom conductive layer 12 can be made of materials such as aluminum, titanium, gold, silver, tungsten, doped silicon or indium tin oxide. The bottom conductive layer 12 is covered by a dielectric protective layer 14 followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating devices 5a and 5b. The reflective and conductive layer 22 is patterned to provide electrodes to the two conformal grating devices 5a and 5b. The ribbon layer 20 preferably comprises a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed and resonance frequency of the conformal grating devices 5a and 5b.

Each of the two devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b formed from the spacer layer 18 and by one or more intermediate supports 27. In FIG. 1, three intermediate supports 27 are shown formed from the spacer layer 18. These intermediate supports 27 are uniformly separated in order to form four equal-width channels 25. The elongated ribbon elements 23a and 23b are secured to the end supports and to the intermediate supports 27. The end supports 24a and 24b are not defined other than at their edges facing the channel 25. A plurality of square standoffs 29 is patterned at the bottom of the channels 25 from the standoff layer 16. These standoffs 29 reduce the possibility of the ribbon elements sticking when actuated. The standoffs may also be patterned in shapes other than square for example rectangular or round.

Figure 2:
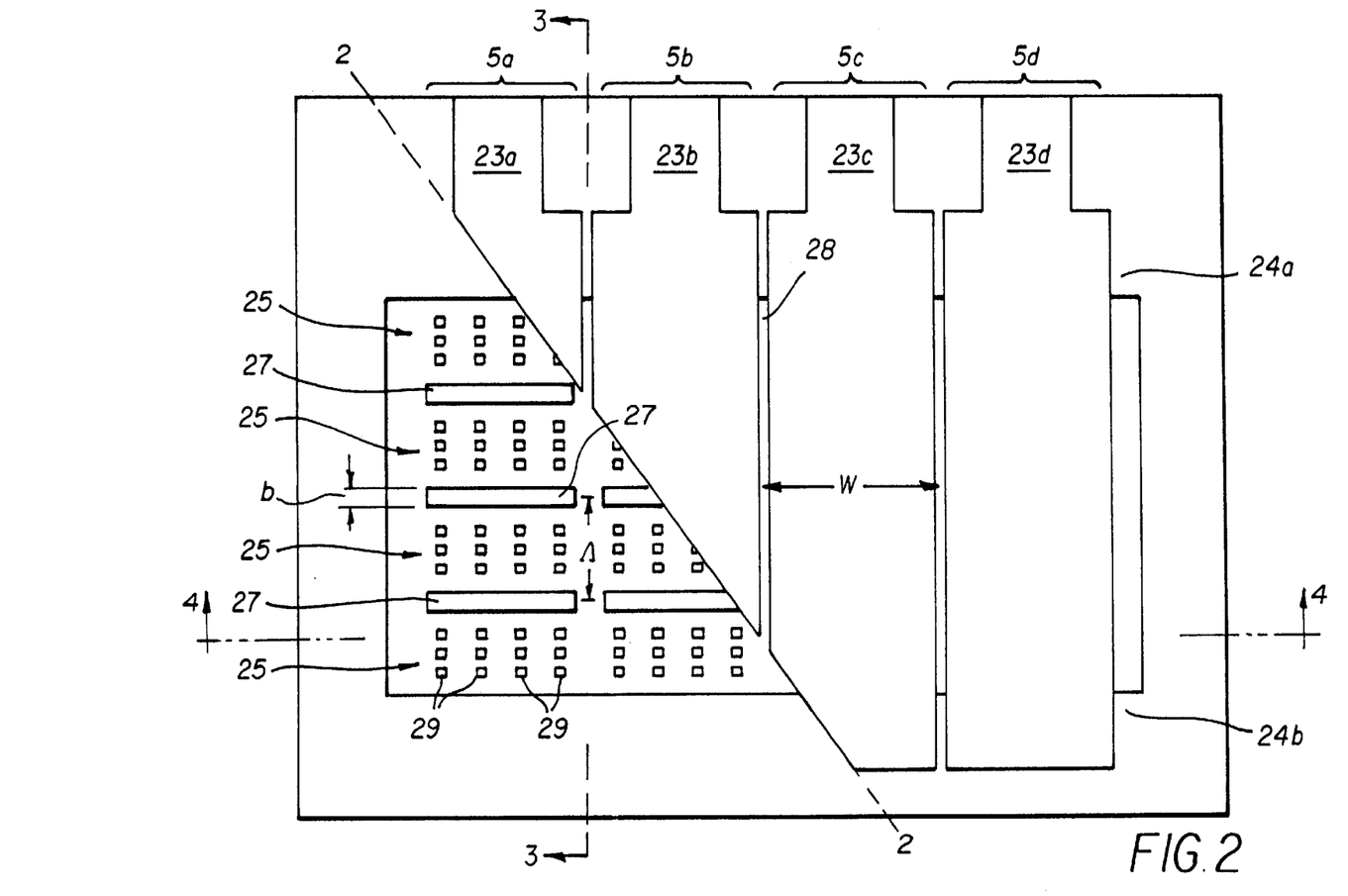
FIG. 2 is a top view of a spatial light modulator with electromechanical conformal grating devices, showing four individually operable devices in a linear array.

A top view of a four-device linear array of conformal grating devices 5a, 5b, 5c and 5d is shown in FIG. 2. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 23a, 23b, 23c and 23d. Therefore, when viewed from the top, the intermediate supports must not be visible in the gaps 28 between the conformal grating devices 5a–5d. Here each of the conformal grating devices has three intermediate supports 27 with four equal-width channels 25. Some conformal grating devices may have as few as one single intermediate support 27. The center-to-center separation A of the intermediate supports 27 or equivalently the center-to-center separation of the channels 25 of the conformal grating device defines the period A of the conformal grating devices in the actuated state. As will be explained in detail later, the width b of the intermediate supports 27 has an important effect on the diffraction efficiency. The elongated ribbon elements 23a–23d are mechanically and electrically isolated from one another, allowing independent operation of the four conformal grating devices 5a–5d. The bottom conductive layer 12 of FIG. 1 can be common to all of the devices.

Figure 3A:
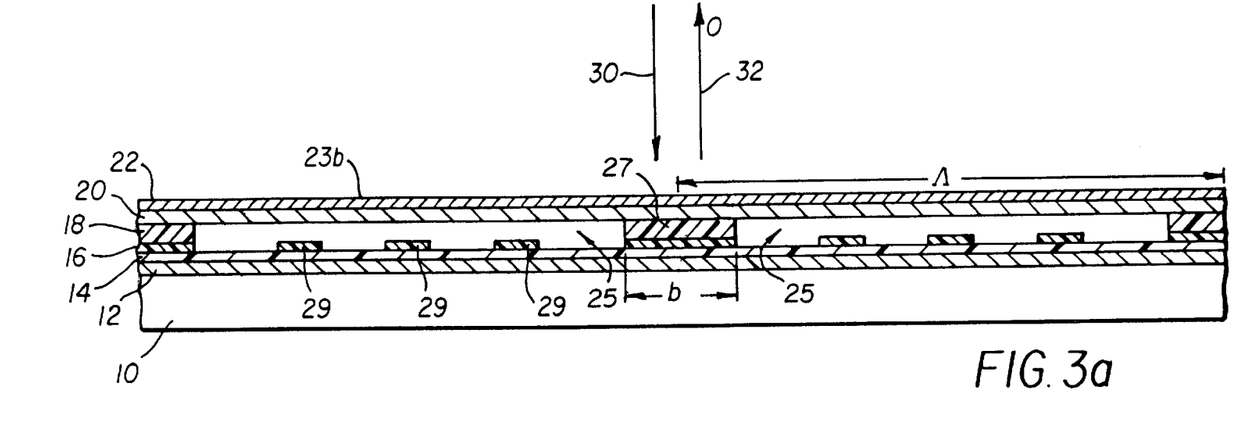
FIGS. 3a and 3b are cross-sectional views through line 3—3 in FIG. 2, showing the operation of an electromechanical conformal grating device in an unactuated state and an actuated state, respectively.
Figure 3B:
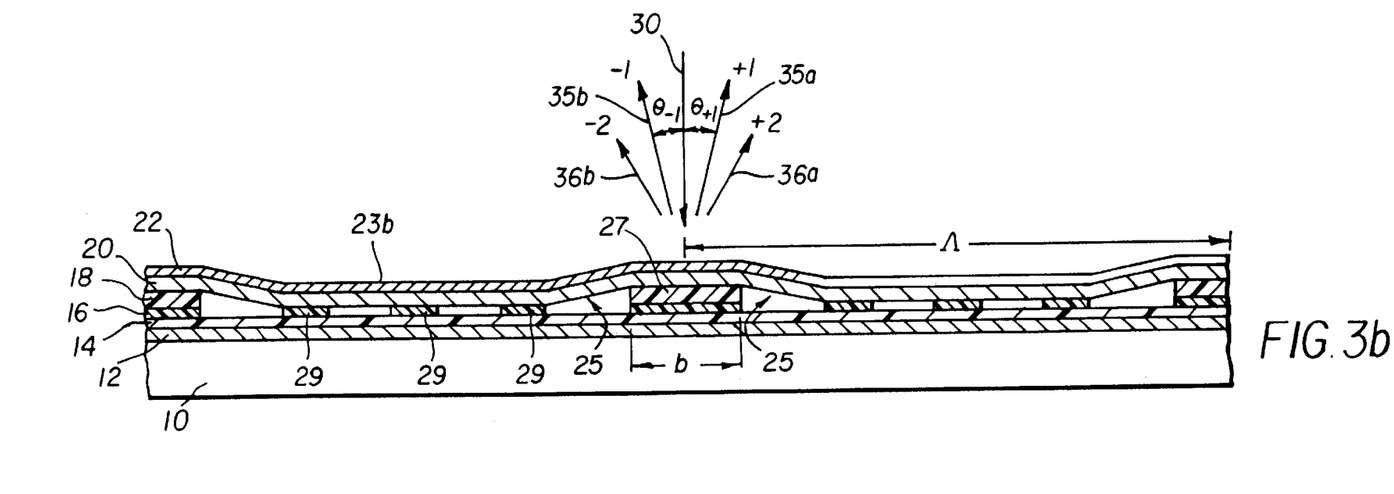

FIG. 3a is a side view, through line 3—3 of FIG. 2, of two channels 25 of the conformal grating device 5a in the unactuated state. FIG. 3b shows the same view of the actuated state. For operation of the device, an attractive electrostatic force is produced by applying a voltage difference between the bottom conductive layer 12 and the conducting layer 22 of the elongated ribbon element 23a. In the unactuated state (see FIG. 3a), with no voltage difference, the ribbon element 23a is suspended flat between the supports. In this state, an incident light beam 30 is primarily reflected 32 into the mirror direction. To obtain the actuated state, a voltage is applied to the conformal grating device 5b, which deforms the elongated ribbon element 23b and produces a partially conformal grating with period Λ. FIG. 3b shows the device in the fully actuated state with the elongated ribbon element 23a in contact with the standoffs 29. The height difference between the bottom of element 23a and the top of the standoffs 29 is chosen to be approximately ¼ of the wavelength λ of the incident light. The optimum height depends on the specific shape of the actuated device. In the actuated state, the incident light beam 30 is primarily diffracted into the $+1^{st}$ order 35a and $-1^{st}$ order 35b, with additional light diffracted into the $+2^{nd}$ order 36a and $-2^{nd}$ order 36b. A small amount of light is diffracted into even higher orders and some is reflected. For light incident perpendicular to the surface of the device, the angle $\theta_m$ between the incident beam and the mth order diffracted beam is given by $$\sin \theta_m = m\lambda/\Lambda,$$

where m is an integer. One or more of the diffracted orders can be collected and used by the optical system, depending on the application. When the applied voltage is removed, the forces due to the tensile stress and bending restores the ribbon element 23a to its original unactuated state.

Figure 4A:
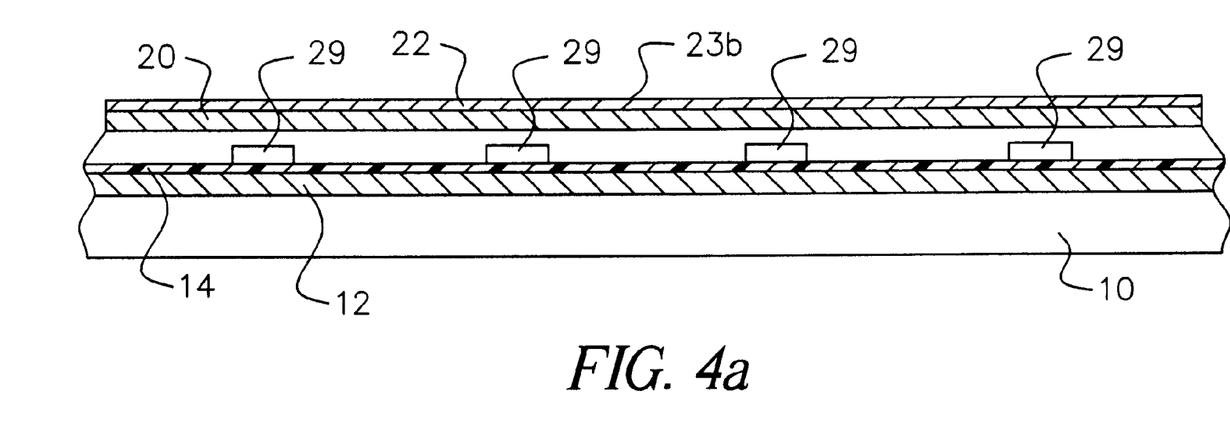
FIGS. 4a and 4b are cross-sectional views through line 4—4 in FIG. 2 showing the device in an unactuated state and an actuated state, respectively.
Figure 4B:
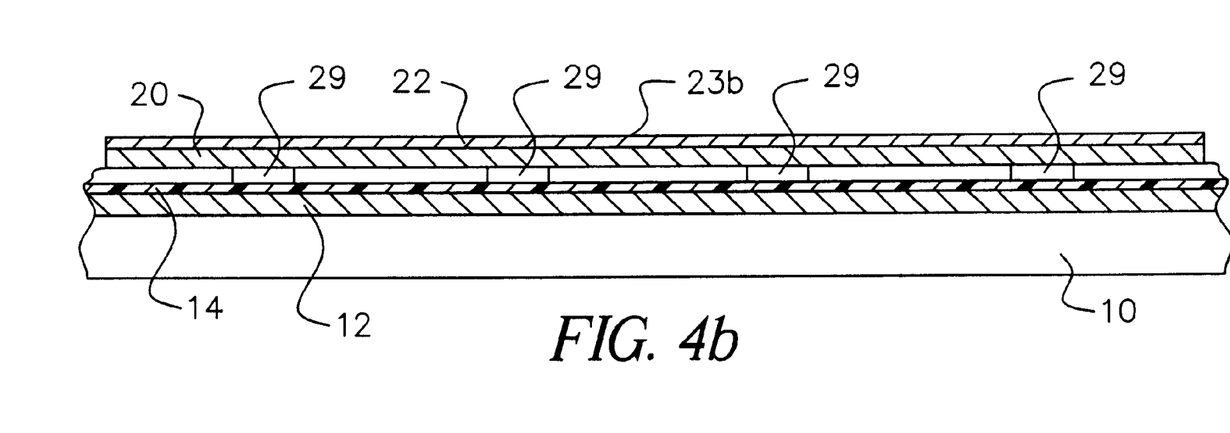

FIGS. 4a and 4b show a rotated side view through line 4—4 of FIG. 2 of the conformal grating device 5b in the unactuated and actuated states, respectively. The elongated ribbon element 23a is suspended by the end support 24b and the adjacent intermediate support 27 (not shown in this perspective). The application of a voltage actuates the device as illustrated in FIG. 4b.

In the preferred embodiment, a linear array of conformal grating devices is formed by arranging the devices as illustrated in FIGS. 1–3 with the direction of the grating period Λ (the y direction) perpendicular to the array direction (the x direction). The diffracted orders are then at various angles in the y-z plane and are perpendicular to the array direction. Even with a large linear array consisting, possibly, of several thousand devices illuminated by a narrow line of light, the diffracted orders become spatially separated over a relatively short distance. This feature simplifies the optical system design and enables feasible designs in which the separation of orders can be done spatially without the need of Schlieren optics.

In a linear array made from conventional GLV devices, the grating period is parallel to the array directions which leads to a much larger distance needed for spatial separation of the diffracted orders. As a comparative example, let us consider an array of conformal grating devices that is 4 cm long (2000 devices 20 μm wide) illuminated by a 100 μm line of light. For devices with a period chosen such that the diffracted orders are angularly separated by 1 degree, the orders will become spatially separated in approximately 6 mm. A similar 4 cm linear array of prior art GLV devices with a 4 degree angular separation between diffracted orders would require at least 60 cm for spatial separation, without the use of a Schlieren optical system.

Furthermore, because the grating period Λ in a conformal grating array is perpendicular to the array direction, the array can be made many periods wide, with no significant constraint on the number of periods possible. Increasing the number of periods improves the optical alignment tolerances and provides some built-in redundancy in case of local device failure. If a portion of a conformal grating device stops functioning, the optical beam can be repositioned to a working portion.

To understand the electromechanical and optical operation of the conformal grating device in more detail, it is helpful to examine the expected performance of a realistic design with the following materials and parameters:

Substrate 10 material: silicon

Bottom conductive layer 12: doped silicon

Protective layer 14: silicon dioxide, thickness=50 nm

Spacer layer 18: silicon dioxide, thickness=150 nm

Ribbon layer 20:silicon nitride, thickness=100 nm, tensile stress=600 MPa

Reflective and conductive layer 22: aluminum, thickness= 50 nm

Grating period Λ=20 μm

Suspended length of elongated ribbon element 23a=16 μm

Width of elongated ribbon element 23a w=30 μm

Width of intermediate supports 27b =4 μm

This type of design allows for fabrication with CMOS methods and integration with CMOS circuitry. The resonant frequency of the ribbon elements in this particular design is approximately 11 MHz. Most practical designs have resonant frequencies between 2 MHz and 15 MHz. Because of this high resonance, the switching time of the device can be very short.

Figure 5:
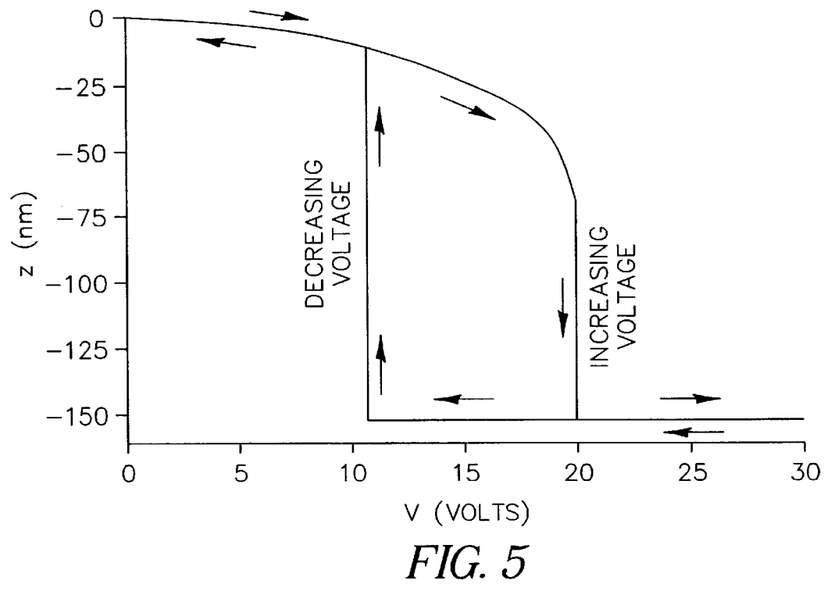
FIG. 5 is a plot showing ribbon element position as a function of applied voltage.
Figure 6:
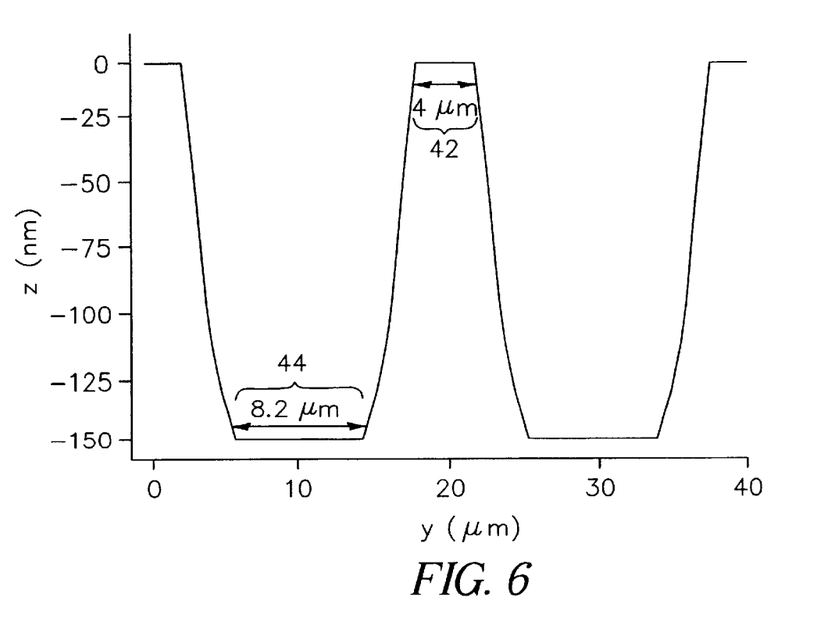
FIG. 6 is a plot showing the ribbon element profile in an actuate state.

FIGS. 5 and 6 show the modeled electromechanical operation of this particular device. FIG. 5 is a plot of the position of the elongated ribbon element at the center of a channel as a function of applied voltage, illustrating the associated hysteresis. As the voltage is increased from 0 V, at a first operating state, the center displacement increases in approximately a quadratic manner, thus deforming the elongated ribbon element until the pull-down voltage of 20.1 V, at a second operating state, is reached. At this voltage, the electrostatic force overcomes the tensile restoring force and the elongated ribbon element slams into the substrate. Further increasing the applied voltage changes the shape of the deformed ribbon, but cannot change the center position. With the ribbon in contact with the substrate, the voltage can be reduced below the pull-down value while maintaining contact, until release at 10.8 V. This hysteresis can be exploited to improve the optical performance of the device. It can also be used as a switch in certain applications.

FIG. 6 shows the profile of the elongated ribbon element in the second operating state, i.e., the actuated state, at 22.1 V. The length of the raised portion 42 is approximately equal to the width of the intermediate support b=4 μm. The length of the lowered portion 44 in contact with the substrate is approximately equal to 8.2 μm. However, as shown in FIG. 7, in order to obtain the maximum possible diffraction efficiency, the length of the raised portion 42 needs to be increased to improve the duty cycle of the grating.

Figure 7:
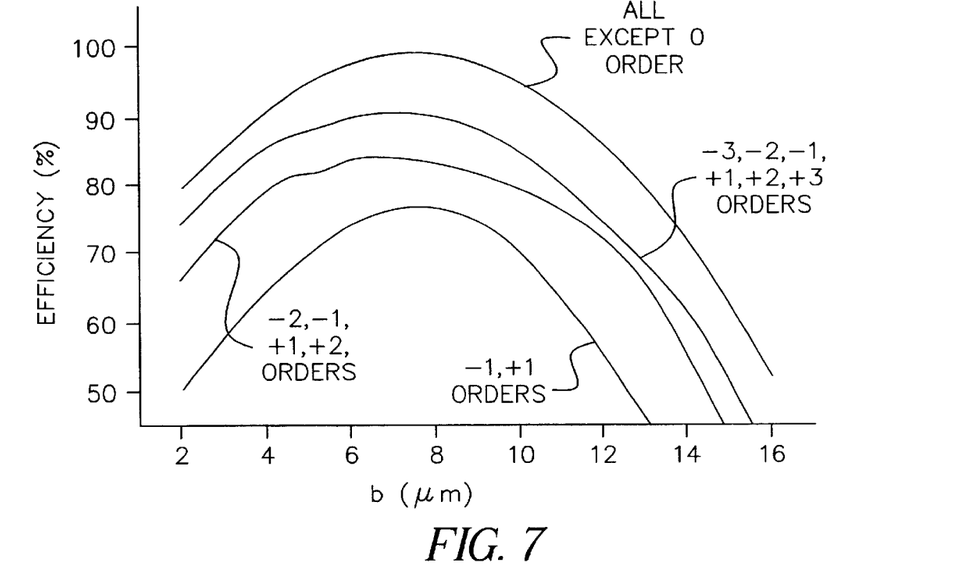
FIG. 7 is a plot showing diffraction efficiency of the conformal grating device as a function of support width for various diffracted order combinations.

FIG. 7 is a plot of the diffraction efficiency of the conformal grating device as a function of changing the width of the intermediate support b while keeping the period Λ=20 μm. It is assumed that the applied voltage is 110% of the pull-down voltage, the illumination wavelength is 550 nm, the reflectivity is 100% and the gaps 55 between elongated ribbon elements are negligible. Efficiency curves are shown for four cases: 1) an optical system that collects of the −1 and +1 order beams; 2) one that collects the −2, −1, +1 and +2 order beams; 3) one that collects the −3, −2, −1, +1, +2 and +3 order beams; and 4) one that collects all orders except for the 0 order beam. It is evident from FIG. 7 that the example of FIG. 6 with b=4 μm does not have the best possible diffraction efficiency. In general, to obtain good diffraction efficiency, the width of the intermediate supports must be chosen such that Λ/4≦b≦Λ/2. For the elongated ribbon element with period Λ=20 μm, good efficiency is achieved with 5 μm≦b≦10 μm. The specific value of b that produces the maximum diffraction efficiency depends on the specific ribbon materials, ribbon geometry and which beams are collected by the optical system. The ribbon materials can have an impact because they affect the extension of the raised portion 42 beyond the width of the intermediate support b. In general, the maximum diffraction efficiency is obtained near b~Λ/3.

Figure 8:
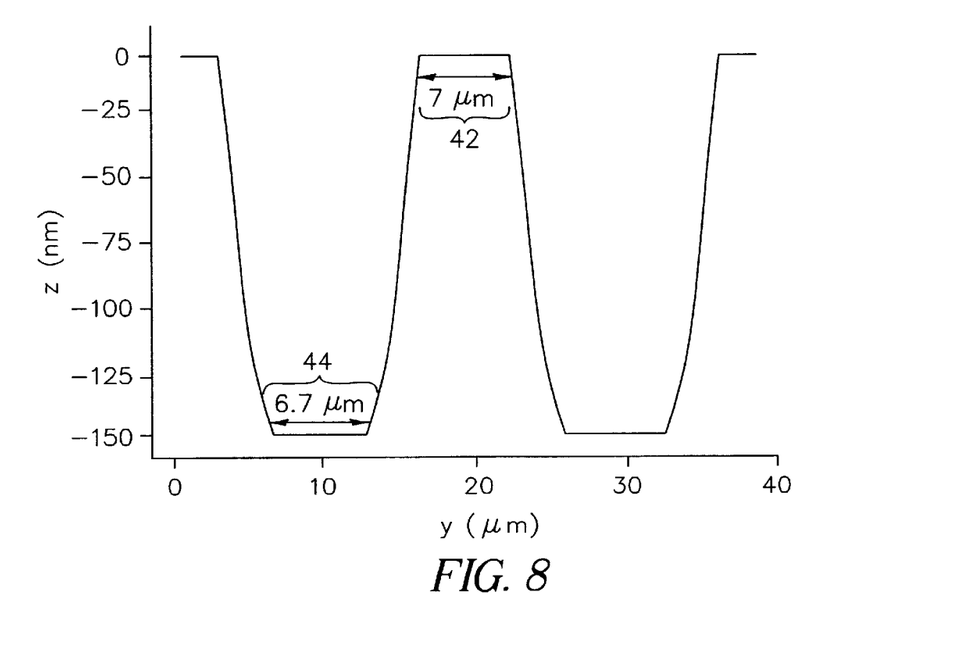
FIG. 8 is a plot showing the ribbon element profile in an actuate state for a device with increased diffraction efficiency.

FIG. 8 shows the profile of the elongated ribbon element in an actuated state having alternating raised and lowered portions 42 and 44 respectively for a conformal grating device with Λ=20 μm and b=7 μm for improved diffraction efficiency. The length of the lowered portion 44 is substantially equal to the length of the raised portion 42.

Figure 9:
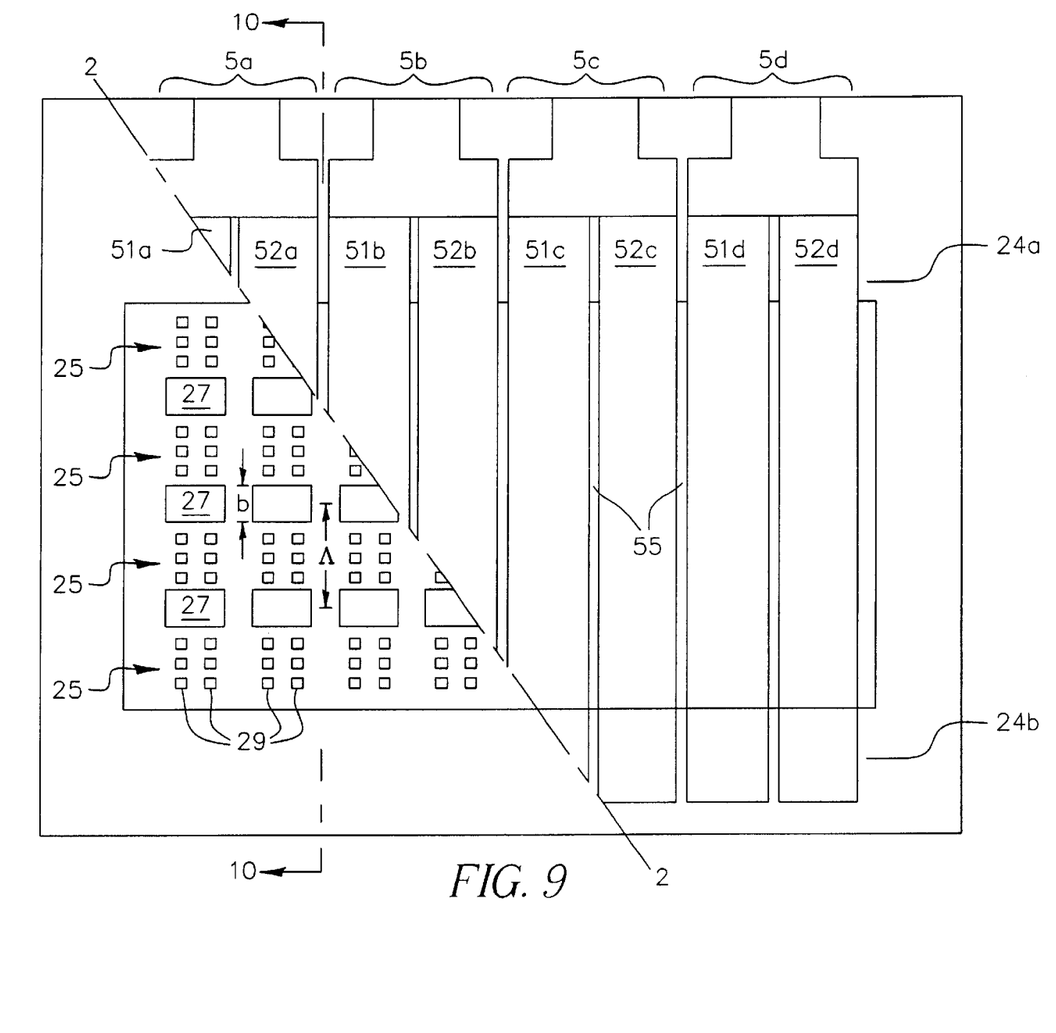
FIG. 9 is a top view of an alternate embodiment of the spatial light modulator.

An alternate embodiment is shown in FIG. 9, which depicts a top view of a four-device linear array similar to FIG. 2. Each of the conformal grating devices 5a, 5b, 5c and 5d now has an associated pair of elongated ribbon elements (51a, 52a), (51b, 52b), (51c, 52c) and (51d, 52d), respectively. This subdivision of each device permits fabrication of wider devices without significantly impacting optical performance. The preferred method of fabrication is to etch a sacrificial layer from the channel, thus releasing the ribbon elements. The gaps 55 between the elements allow the etchant to access this sacrificial layer. Increasing the number of gaps 55 can therefore improve the etching process. In practice, it may be necessary to further subdivide the conformal grating devices into more than two. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 51a, 52a, 51b, 52b, 51c, 52c, 51d and 52d. Therefore, when viewed from the top, the intermediate supports 27 must not penetrate into the gaps 55. The ribbon elements within a single conformal grating device are mechanically isolated, but electrically coupled. They therefore operate in unison when a voltage is applied.

Figure 10:
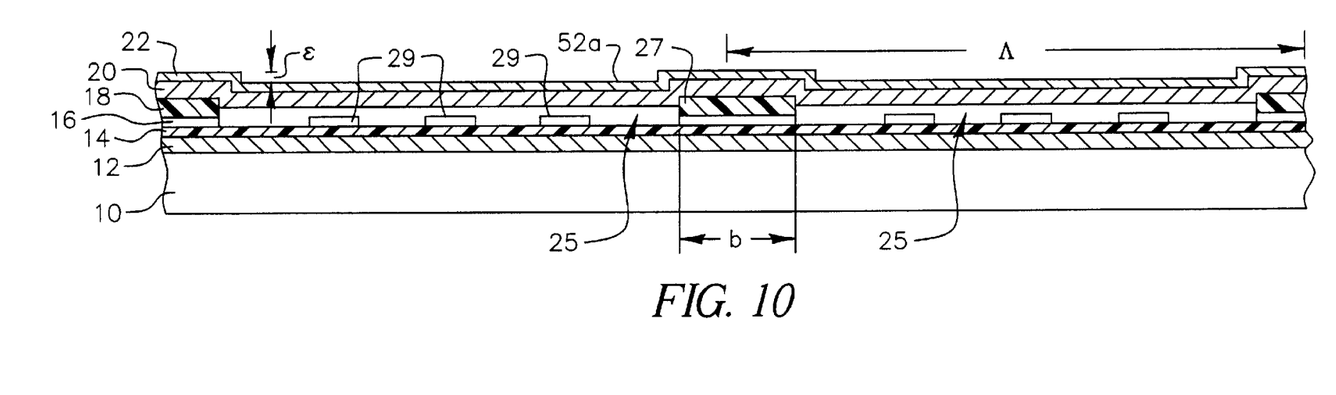
FIG. 10 is a cross-sectional view through line 3—3 in FIG. 9 for a conformal grating device that is manufactured with protruding intermediate supports resulting in a reduced contrast.

FIG. 10 is a side view, through line 10—10 of FIG. 9, of two channels 25 of the conformal grating device 5a in the unactuated state. In this particular example, the device is not manufactured perfectly and there is a small protruding step of height ε near the intermediate supports 27. The elongated ribbon element 52a therefore has a weak grating of period Λ in the unactuated state that causes a small portion of an incident light beam to be diffracted into the $-2^{nd}$, $-1^{st}$, $+1^{st}$ and $+2^{nd}$ orders. The result is a reduction in the contrast of the device. The same manufacturing error can exist in the conformal grating devices of FIGS. 1 and 2. One way to minimize the impact of this weak grating on contrast is to make the width b of the intermediate supports as small as possible. However, as explained earlier, reducing b decreases the diffraction efficiency of the device. An alternative solution that maintains high diffraction efficiency is described below.

Figure 11A:
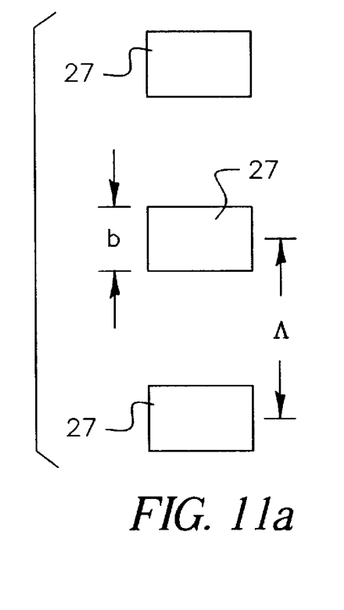
FIGS. 11a through 11c are top views of different intermediate support geometries.
Figure 11B:
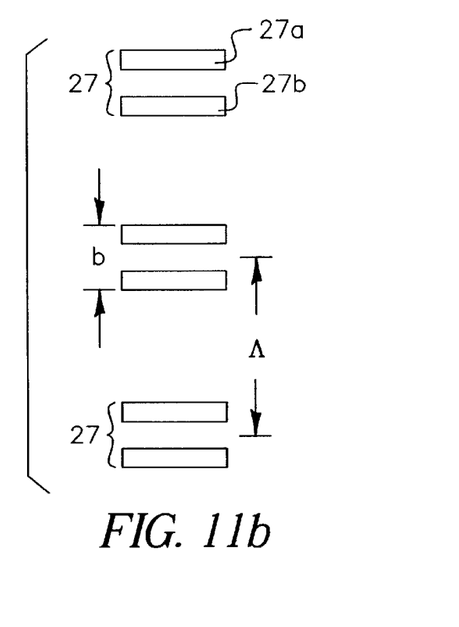
Figure 11C:
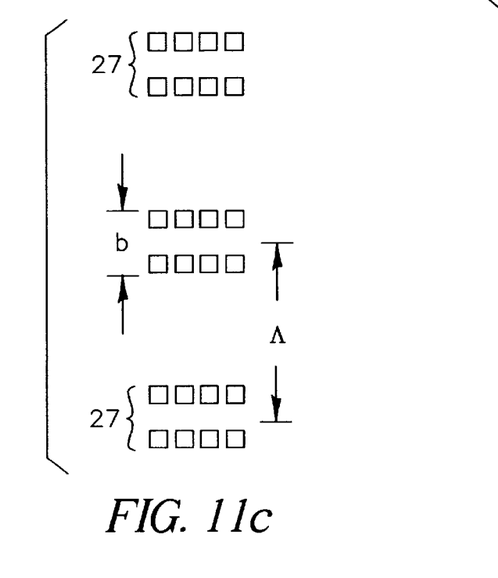

FIGS. 11a–11c shows three designs that have the same value of b for the intermediate supports 27 of FIG. 10. Each of these designs therefore leads to the same diffraction efficiency in the actuated state. FIG. 11a shows the intermediate supports 27 of FIG. 10. FIG. 11b shows an alternative embodiment in which the intermediate supports 27 are subdivided into a pair of corresponding sub-supports 27a and 27b. This subdivision improves the contrast of the device by reducing the diffraction efficiency of the weak grating formed in the unactuated state. Each of these pairs of corresponding sub-supports 27a and 27b could be less than 1 μm in width. FIG. 11c shows a further embodiment wherein the intermediate supports 27 are subdivided into even more sub-supports. Sub-supports could also be formed from the outer wall of intermediate supports. These types of subdivisions make it possible to manufacture a device that simultaneously has high contrast and high efficiency. For the high efficiency example of FIG. 8, with Λ=20 μm and b=7 μm, each of the intermediate supports 27 could have 1 μm wide corresponding sub-supports 27a and 27b separated by 5 μm. The sub-supports may have a shape other than square or rectangular.

Furthermore, the design of the sub-supports has an impact on the voltage that can be used to deflect the elongated ribbon elements in the actuated state. Specifically, the voltage needs to be low enough for the elongated ribbon elements to remain suspended between the sub-support. Consequently, for good sub-support designs there is little deflection between individual pairs of sub-supports, but there is complete deflection between intermediate supports. The high efficiency example discussed above with Λ=20 μm, b=7 μm, and two 1 μm wide sub-supports separated by 5 μm satisfies the requirement of having very little deflection between sub-supports in the actuated state for a wide range of voltages. For more voltage latitude, three 1 μm wide sub-supports separated by 2 μm could be used.

Figure 12:
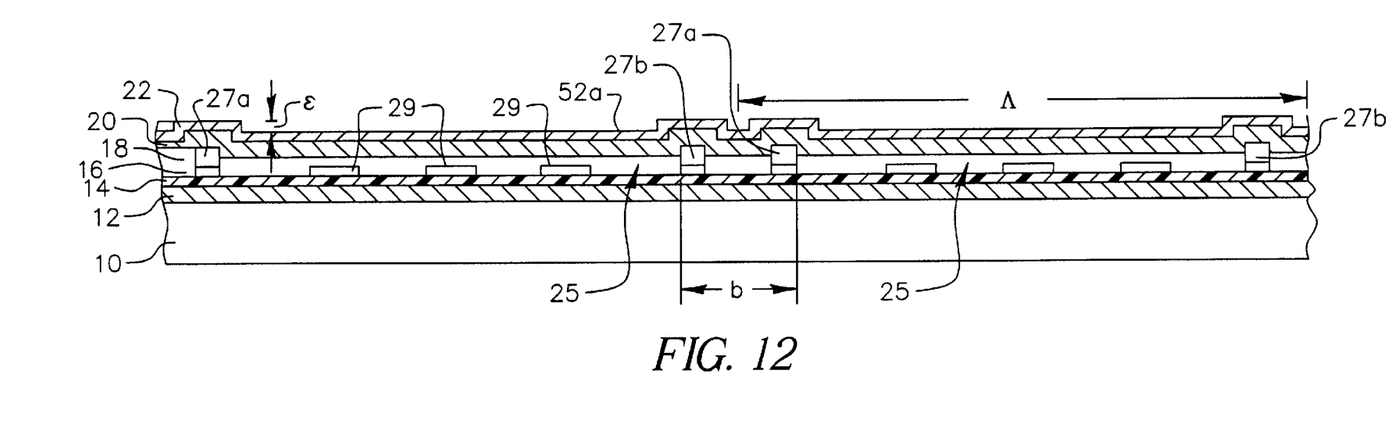
FIG. 12 is a side view of a conformal grating device with the intermediate supports subdivided into two sub-supports.

FIG. 12 shows a side view of two channels 25 of a conformal grating device 5a in the unactuated state with the intermediate supports 27 subdivided into two sub-supports 27a and 27b as in FIG. 11b. This device will have higher contrast than the device of FIG. 10 because a larger percentage of the elongated ribbon element 52a is at the same height. In practice, the relative improvement may be larger than illustrated in FIG. 12 because the tensile force of the elongated ribbon element 52a will cause some flattening, reducing the overall height ε. It should be noted that in the actuated state (not shown in FIG. 12), the elongated ribbon element remains nearly flat between the sub-supports 27a and 27b of a single corresponding intermediate support 27, while making contact with the standoffs 29 between two adjacent intermediate supports 27.

The invention has been described in detail with particular reference to certain preferred embodiments thereof, but it will be understood that variations and modifications can be effected within the spirit and scope of the invention.

PARTS LIST

| | |
|---|---|
| 5a | conformal grating device |
| 5b | conformal grating device |
| 5c | conformal grating device |
| 5d | conformal grating device |
| 10 | substrate |
| 12 | bottom conductive layer |
| 14 | protective layer |
| 16 | standoff layer |
| 18 | spacer layer |
| 20 | ribbon layer |
| 22 | reflective and conductive layer |
| 23a | elongated ribbon element |
| 23b | elongated ribbon element |
| 23c | elongated ribbon element |
| 23d | elongated ribbon element |
| 24a | end support |
| 24b | end support |
| 25 | channel |
| 27 | intermediate support |
| 27a | sub-support |
| 27b | sub-support |
| 29 | standoff |
| 30 | incident light beam |
| 32 | reflected light beam |
| 35a | $+1^{st}$ order beam |
| 35b | $-1^{st}$ order beam |
| 36a | $+2^{nd}$ order beam |
| 36b | $-2^{nd}$ order beam |
| 42 | raised portion |
| 44 | lowered portion |
| 51a | elongated ribbon element |
| 51b | elongated ribbon element |
| 51c | elongated ribbon element |
| 51d | elongated ribbon element |
| 52a | elongated ribbon element |
| 52b | elongated ribbon element |
| 52c | elongated ribbon element |
| 52d | elongated ribbon element |
| 55 | gap |

What is claimed is:

1. An electromechanical conformal grating device having a period Λ, comprising:

a) an elongated ribbon element including a light reflective surface;

b) a pair of end supports for supporting the elongated ribbon element at both ends over a substrate;

c) an intermediate support;

d) means for applying a force to the elongated ribbon element to cause the element to deform between first and second operating states, where in the second operating state the elongated ribbon element mechanically conforms to the intermediate support forming an optical grating having a diffraction grating period Λ with alternating raised and lowered portions;

e) the diffraction grating period Λ being determined by the placement of the intermediate support; and f) the lengths of the raised and lowered portions being substantially equal.

2. The mechanical conformal grating device claimed in claim 1, wherein the intermediate support has a width b, and b is chosen such that $\Lambda/4 \leq b \leq \Lambda/2$.

3. An electromechanical conformal grating device having a period Λ with improved optical efficiency and contrast, comprising:

a) an elongated ribbon element including a light reflective surface;

b) a pair of end supports for supporting the elongated ribbon element at both ends over a substrate;

c) at least one intermediate support having a width b, where in width b there are sub-supports of the at least one intermediate support present; and d) means for applying a force to the elongated ribbon element to cause the element to deform between first and second operating states, where in the second operating state the elongated ribbon element conforms mechanically to the intermediate support and stays suspended between the sub-supports to form an optical grating.

4. The mechanical conformal grating device claimed in claim 3, wherein there are at least two spaced apart sub-supports present within b.

5. The mechanical conformal grating device claimed in claim 3, wherein the width b is chosen such that $\Lambda/4 \leq b \leq \Lambda/2$.

6. The mechanical conformal grating device claimed in claim 3, wherein the width b is chosen such that $b \sim \Lambda/3$.

7. The mechanical conformal grating device claimed in claim 3, such that in the first operating state, the elongated ribbon element functions as a plane reflector and in the second operating state the elongated ribbon element functions as a diffraction grating with a period parallel to the length of the elongated ribbon element.

8. The mechanical conformal grating device claimed in claim 3, wherein the sub-supports contact the elongated ribbon element only when in the second operating state.

9. The mechanical conformal grating device claimed in claim 3, wherein the elongated ribbon element is supported under tension.

10. The mechanical conformal grating device claimed in claim 3, further including a standoff located on the substrate under the elongated ribbon element to prevent the elongated ribbon element from sticking to the substrate when the elongated ribbon element is deformed.

11. The mechanical conformal grating device claimed in claim 3, wherein the force is an electrostatic force.

12. The mechanical conformal grating device claimed in claim 11, wherein the elongated ribbon element includes a first conductor, and the substrate under the elongated ribbon element includes a second conductor for applying a voltage to generate the electrostatic force.

13. The mechanical conformal grating device claimed in claim 3, wherein the elongated ribbon element comprises a plurality of parallel spaced apart portions.

14. The mechanical conformal grating device claimed in claim 3, wherein the elongated ribbon element is secured to the sub-supports and the end supports.

15. The mechanical conformal grating device claimed in claim 3, wherein in the first operating state the elongated ribbon element is suspended flat, and in the second operating state the elongated ribbon element has a smoothly varying profile with at least two periods.

16. An electromechanical conformal grating device having a period with $\Lambda$ improved optical efficiency, comprising:

a) an elongated ribbon element including a light reflective surface;

b) a pair of end supports for supporting the elongated ribbon element at both ends over a substrate;

c) at least one intermediate support having a width b, wherein the width b is chosen such that $\Lambda/4 \leq b \leq \Lambda/2$; and d) means for applying a force to the elongated ribbon element to cause the element to deform between first and second operating states, wherein the elongated ribbon element conforms mechanically to the intermediate support.

17. The mechanical conformal grating device claimed in claim 16, wherein the width b is chosen such that $b \sim \Lambda/3$.

18. The mechanical conformal grating device claimed in claim 16, wherein in the first operating state, the elongated ribbon element functions as a plane reflector and in the second operating state the elongated ribbon element functions as a diffraction grating with a period parallel to the length of the elongated ribbon element.

19. The mechanical conformal grating device claimed in claim 16, wherein the intermediate supports contact the elongated ribbon element only when in the second operating state.

20. The mechanical conformal grating device claimed in claim 16, wherein the elongated ribbon element is supported under tension.

21. The mechanical conformal grating device claimed in claim 16, further including a standoff located on the substrate under the elongated ribbon element to prevent the elongated ribbon element from sticking to the substrate when the elongated ribbon element is deformed.

22. The mechanical conformal grating device claimed in claim 16, wherein the force is an electrostatic force.

23. The mechanical conformal grating device claimed in claim 22, wherein the elongated ribbon element includes a first conductor, and the substrate under the elongated ribbon element includes a second conductor for applying a voltage to generate the electrostatic force.

24. The mechanical conformal grating device claimed in claim 16, wherein the elongated ribbon element comprises a plurality of parallel spaced apart portions.

25. The mechanical conformal grating device claimed in claim 16, wherein the elongated ribbon element is secured to the intermediate supports and the end supports.

26. The mechanical conformal grating device claimed in claim 16, wherein in the first operating state the elongated ribbon element is suspended flat and in the second operating state the elongated ribbon element has a smoothly varying profile with at least two periods.

27. An electromechanical conformal grating device having a period with $\Lambda$ improved optical efficiency and contrast, comprising:

a) an elongated ribbon element including a light reflective surface;

b) a pair of end supports for supporting the elongated ribbon element at both ends over a substrate;

c) at least one intermediate support having a width b, wherein the width b is chosen such that $\Lambda/4 \leq b \leq \Lambda/2$, and there are at least two spaced apart sub-supports present within b;

d) means for applying a force to the elongated ribbon element to cause the element to deform between first and second operating states, where in the first operating state the elongated ribbon element is suspended flat and in the second operating state the elongated ribbon element conforms mechanically to the intermediate support and stays suspended between the sub-supports to form an optical grating with a smoothly varying profile having at least two periods; and e) the elongated ribbon element being secured to the sub-supports and the end supports.

28. The mechanical conformal grating device claimed in claim 27, wherein the width b is chosen such that $b \sim \Lambda/3$.

29. The mechanical conformal grating device claimed in claim 27, wherein in the first operating state, the elongated ribbon element functions as a plane reflector and in the second operating state the elongated ribbon element functions as a diffraction grating with a period parallel to the length of the elongated ribbon element.

* * * * *